United States Patent [19]

Boldt et al.

[11] 3,937,659

[45] Feb. 10, 1976

[54] POLYCHLOROPRENE MIXTURE

[75] Inventors: Jürgen Boldt, Opladen; Kurt Heine, Bad Honnef, both of Germany

[73] Assignee: Bayer Aktiengesellschaft, Germany

[22] Filed: Mar. 5, 1974

[21] Appl. No.: 448,188

[30] Foreign Application Priority Data

Mar. 9, 1973 Germany............................ 2311672

[52] U.S. Cl. ......... 204/159.2; 204/159.17; 260/890
[51] Int. Cl.$^2$............................................ C08F 2/46
[58] Field of Search ..... 260/890; 204/159.17, 159.2

[56] References Cited
UNITED STATES PATENTS

| | | | |
|---|---|---|---|
| 3,042,652 | 7/1962 | Pariser et al........................ | 260/890 |
| 3,388,188 | 6/1968 | Sturt.................................... | 260/890 |
| 3,714,296 | 1/1973 | Kitagawa et al.................... | 260/890 |

*Primary Examiner*—Murray Tillman
*Assistant Examiner*—J. Ziegler
*Attorney, Agent, or Firm*—Connolly and Hutz

[57] ABSTRACT

Mixture of
a. 90 to 20 parts by weight of a benzene-soluble chloroprene polymer having a Mooney viscosity ML-4' at 100°C of 30 to 100 and
b. 10 to 80 parts by weight of a chemically and physically cross-linked benzene-insoluble chloroprene polymer in which chemical precross-linking is first carried out by copolymerisation with 1 – 10% by weight, based on the monomer mixture, of a copolymerisable monomer which contains two ethylenically unsaturated carbon-carbon double bonds and this is then followed by physical precross-linking by high energy radiation; the polymers have a Mooney viscosity ML-4' at 100°C of 30 to 75.

7 Claims, No Drawings

POLYCHLOROPRENE MIXTURE

To produce high-quality rubber articles of complicated shape, it is necessary to use chloroprene polymers which have exceptionally good processing properties. A material suitable for this purpose must have low shrinkage and low swelling upon extrusion and must be able to fill complicated moulds completely. An unvulcanised moulding must retain its shape exactly and must have a smooth surface; the material itself must be capable of rapid and easy moulding, e.g. extrusion.

Chloroprene polymers which have these properties can be obtained, for example, by mixing a benzene soluble polychloroprene with a benzene insoluble chloroprene copolymer, i.a. a pre-crosslinked product. Copolymers of this kind are, for example, the copolymers of chloroprene with alkanediol dicarylates or dimethacrylates, e.g. ethanediol dimethacrylate. Copolymers of this kind and mixtures thereof with benzene soluble polychloroprenes have been described e.g. in U.K. Pat. No. 1,158,970. The described products have the desired properties, prior to vulcanisation but their vulcanisates are unsatisfactory.

U.S. Pat. No. 3,042,652 discloses a mixture of a benzene soluble polychloroprene and a polychloroprene which has been rendered insoluble in benzene by exposure to $\gamma$ or $\beta$ radiation. This mixture, however, does not have the desired properties in the unvulcanised state.

The present invention provides a chloroprene polymer mixture of a. 90 to 20 parts by weight, preferably 85 to 50 parts by weight, of a benzene soluble chloroprene polymer which has a Mooney viscosity ML-4' at 100°C of 30 to 100, and b. 10 to 80 parts by weight, preferably 15 to 50 parts by weight, of a pre-crosslinked, benzene-insoluble copolymer of 90 to 99 % by weight, preferably 95 to 98 % by weight of chloroprene and 1 to 10 % by weight, preferably 2 to 5 % by weight of a copolymerisable monomer which contains two ethylenically unsaturated carbon-carbon double bonds and which has been treated with high energy radiation and has a Mooney viscosity ML-4' at 100°C of 30 to 75, preferably 40 to 55.

This mixture has the required properties of easy processing and yields vulcanisates with the desired properties.

Component (a) of this mixture, according to the present invention, is a chloroprene homo- or co- polymer containing up to 10% by weight, based on the chloroprene, of an ethylenically unsaturated comonomer. Examples of suitable comomoners are: 2,3-dichlorobutadiene-(1,3), 1-chlorobutadiene and styrene. These polymers and copolymers are known. They can be obtained by known methods, e.g. polymerising the monomers in aqueous emulsion with activators in the presence of molecular weight regulators and emulsifiers. Chloroprene polymers of this kind and their preparation have been described e.g. in U.S.-Pat. No. 2,567,117 and U.K. Pat. No. 512,458.

The copolymers of component (b) in the above mixtures are also known. It is preferred to use copolymers of 90 to 99% by weight, preferably 95 to 98% by weight, of chloroprene and 1 to 10% by weight, preferably 2 to 5% by weight, of diesters of aliphatic dialcohols and ethylenically unsaturated monocarboxylic acids of the formula

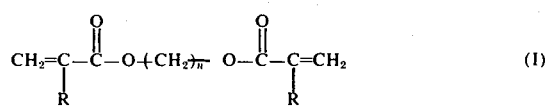

in which R denotes hydrogen or an alkyl radical containing from 1 to 6 carbon atoms and $n$ denotes an integer of from 2 to 6. R is preferably hydrogen or methyl and $n$ is preferably 2. The corresponding copolymers of chloroprene with aromatic divinyl compounds such as divinylbenzene or diisopropenylbenzene are also suitable. The preparation of such copolymers is known. The conventional polymerisation process in aqueous emulsion, as used for the preparation of the compounds of component (a), is also used in this case, but here polymerisation is advantageously continued to a higher rate of conversion, namely 80 to 95%.

The thus obtained copolymer latices are subsequently treated with ionising radiation, preferably $\gamma$ rays or high speed electrons from an accelerator. In principle, any high energy electromagnetic radiation may be used as ionising radiation, e.g. X-rays or $\gamma$ rays, also corpuscular radiation, e.g. irradiation with $\alpha$ particles, deuterons, protons or electrons.

For irradiation with high speed electrons, e.g. from a Van de Graaff accelerator, a layer of latex 1 to 30 mm in thickness, depending on the energy of radiation, is exposed to a dobe of from 0.1 to 10.0 Mrad, preferably from 1 to 5 Mrad, in an inert gas atmosphere, (e.g. nitrogen), or air at from 0° to 100°C, preferably at approximately 20°C. The energy of radiation may be from 0.1 to 10 MeV and preferably from 0.3 to 3.0 MeV. The intensity of radiation may be from 0.01 to 2000 Mrad/h and preferably from 1 to 500 Mrad/h.

The method of preparing benzene soluble chloroprene polymers, Component (a), and benzene insoluble precross-linked chloroprene polymers, Component (b) are known. These products are generally prepared by polymerisation in aqueous emulsion. Any of the conventional emulsifiers may be used, e.g. water-soluble salts, in particular alkali metal salts of long chain fatty acids, resinic acids, disproportionated resinic acids, condensation products of formaldehyde and naphthalene sulphonic acid, alkyl and aryl sulphonates or sulphates and alkoxylated alcohols and phenols.

Polymerisation may be initiated by means of the usual free-radical catalysts, for example cumene hydro peroxide, paramenthane hydroperoxide or water-soluble salts of peroxydisulphuric acid, usually in combination with $\beta$-anthraquinone sulphonic acid, azo-bis-isobutyronitrile and salts of formamidine sulphinic acid. Suitable molecular weight regulators are the aliphatic mercaptans known for this purpose, such as N-dodecylmercaptan and dialkyl or dialkoxyalkyl xanthogen disulphides, for example of the formula

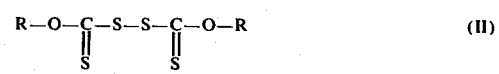

in which R denotes an alkyl group containing from 1 to 6 carbon atoms or an alkoxyalkyl group containing from 2 to 10 carbon atoms and from 1 to 3 oxygen atoms.

According to the present invention, the polymer mixture is preferably prepared by mixing the components in the form of their latices and precipitating the latex mixture. The polymers are usually precipitated by addition of electrolytes; the solid rubbers are filtered off and dried in a screw extruder. Alternatively, the polymers are precipitated by freezing the latex mixture, the solid polymers being dried in a drying chamber.

The chloroprene polymer mixtures obtained according to the present invention can easily be processed to form rubber compositions containing the usual fillers, plasticisers and other auxiliary substances.

The mixtures themselves can easily be formed into sheets and can readily be shaped by extrusion; they have little tendency to swell upon extrusion and have high green strength and also a smooth surface. Furthermore their vulcanisates have exceptionally high tensile strengths and structural stability, e.g. when compared with the products described in U.K. Pat. No. 1,158,978, in some cases as much as a 30 % increase in strength.

EXAMPLES

I. Examples of polymerisation a. Benzene soluble polychloroprene

EXAMPLE 1

Formulation:

| | | |
|---|---|---|
| Chloroprene | 100.00 | parts by weight |
| Phenothiazine | 0.015 | " |
| n-dodecylmercaptan | 0.28 | " |
| Deionized water | 120.00 | " |
| Sodium salt of a disproportionated abietic acid | 3.50 | " |
| Sodium salt of a condensation product of formaldehyde and naphthalene sulphonic acid | 0.65 | " |
| Sodium hydroxide | 0.65 | " |
| Tetrasodium pyrophosphate | 0.50 | " |

The mixture, activated with 1% aqueous formamidine sulphinic acid solution, is allowed to polymerise at 43°C. Polymerisation is terminated at approximately 65% conversion and the unreacted monomer is removed by steam distillation at reduced pressure.

EXAMPLE 2

Formulation:

As in Example 1, except that 0.40 parts by weight of diethylxanthogen disulphide is used instead of 0.28 n-dodecylmercaptan as molecular weight regulator.

b. Benzene insoluble, precross-linked polychloroprene

EXAMPLE 3

Formulation:

| | | |
|---|---|---|
| Chloroprene | 95.00 | Parts by weight |
| Ethane diol dimethacrylate | 5.00 | " |
| n-Dodecylmercaptan | 0.38 | " |
| Deionized water | 120.00 | " |
| Sodium salt of a disproportionated abietic acid | 3.50 | " |
| Sodium salt of a condensation product of naphthalene sulphonic acid and formaldehyde | 0.60 | " |
| Sodium hydroxide | 0.30 | " |
| Tetrasodium pyrophosphate | 0.50 | " |

The mixture activated with 1% of aqueous formamidine sulphinic acid solution, is allowed to polymerise at 43°C. Polymerisation is terminated at a monomer conversion of approximately 80% and unreacted chloroprene is removed by steam distillation at reduced pressure. The latices are flushed with nitrogen for 10 minutes and then passed, as a continuous 4 mm thick layer, under the beam of a Van de Graaff accelerator (Beam voltage = 2 MeV, Beam current intensity = 200 $\mu$ A, Dose 1 Mrad).

EXAMPLE 4

Formulation:

| | | |
|---|---|---|
| Chloroprene | 90.00 | Parts by weight |
| Ethanediol dimethacrylate | 10.00 | " |
| n-Dodecylmercaptan | 0.38 | " |
| Deionized water | 120.00 | " |
| Sodium salt of a disproportionated abietic acid | 3.50 | " |
| Sodium salt of a condensation product of formaldehyde and naphthalene sulphonic acid | 0.60 | " |
| Sodium hydroxide | 0.30 | " |
| Tetrasodium pyrophosphate | 0.50 | " |

The mixture activated with 1% aqueous formamidine sulphinic acid solution, is allowed to polymerise at 43°C. Polymerisation is terminated at approximately 80% monomer conversion and unreacted chloroprene is removed by steam distillation at reduced pressure.

II. Examples of mixtures

The latices prepared according to Examples 1 to 4 were mixed in various combinations to produce mixtures containing the quantities of polymer shown in Table 1. The polymers were isolated by effecting precipitation by freezing and then drying in a drying cupboard.

Table 1

|  | A | | B | |
|---|---|---|---|---|
|  | Example 1 Parts by weight | Example 2 Parts by weight | Example 3 Parts by weight | Example 4 Parts by weight |
| Polymer mixture I | 55 | — | — | 45 |
| Polymer mixture II | 55 | — | 45 | — |
| Polymer mixture III | 85 | — | — | 15 |
| Polymer mixture IV | 85 | — | 15 | — |
| Polymer mixture V | — | 85 | — | 15 |
| Polymer mixture VI | — | 85 | 15 | — |

Vulcanizable mixtures were prepared from the polymer mixtures of Table 1 in accordance with the following formulation:

| 100.0 | Parts by weight of | polymer mixture |
|---|---|---|
| 29.0 | " | active carbon black (N 770) |
| 0.5 | " | stearic acid |
| 1.0 | " | paraffin oil |
| 2.0 | " | phenyl-β-naphthylamine |
| 4.0 | " | Magnesium oxide |
| 5.0 | " | zinc oxide |
| 0.5 | " | ethylene thiourea |

These mixtures were vulcanized by heating them to 150°C for from 20 to 30 minutes.

The physical properties of the polymer mixtures and vulcanized materials are summarized in Table 2: Mixtures I, III and V are for comparison purposes, Mixtures II, IV and VI are examples of the present invention. On comparing the pairs I–II, III–IV and V–VI, it is found that the stability of the raw materials and their working properties are substantially similar in both cases, but that the vulcanized materials obtained from the mixtures according to the present invention are substantially stronger.

weight of chloroprene and 1 to 10% by weight of a copolymerizable monomer of the formula

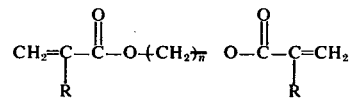

wherein R is hydrogen or alkyl having 1 to 6 carbon atoms and $n$ is an integer of from 2 to 6, said copolymer of (b) having been irradiated by γ-radiation or high speed electron radiation at a dose of 0.1 to 10.0 Mrad applied to a layer of (b) of 1 to 30 mm thickness in latex form and at a radiation intensity of 0.01 to 2,000 Mrad/h.

2. A composition as claimed in claim 1 in which component (a) consists of one or more chloroprene homo- or co-polymers containing from 1 to 10 %, based on the monomer mixture, of at least one ethylenically unsaturated comonomer.

3. A composition as claimed in claim 2 in which the ethylenically unsaturated comonomer is selected from 2,3-dichlorobutadiene, 1-chlorobutadiene and styrene.

Table 2

| Properties tested | | I | II | III | IV | V | VI |
|---|---|---|---|---|---|---|---|
| Raw polymer: | | | | | | | |
| Mooney viscosity (ML-4', 100°C) | | 57 | 59 | 53 | 46 | 52 | 50 |
| Mooney stability (3) | | +9 | +9 | +5 | +6 | +3 | +3 |
| Vulcanisable mixture: | | | | | | | |
| Appearance of an extruded tyre tread | (1) | 1–2 | 2 | 2 | 2 | 2 | 1–2 |
| Velocity of extrusion (m/min) | (2) | 2.1 | 2.2 | 2.1 | 2.1 | 2.2 | 2.1 |
| Shrinkage (%)[2] | | 41 | 48 | 59 | 57 | 56 | 64 |
| Vulcanized (Standard ring) | | | | | | | |
| Tear resistance (kg/cm²) | 20' | 121 | 160 | 163 | 166 | 172 | 188 |
|  | 30' | 117 | 157 | 159 | 174 | 167 | 187 |
| Elongation at break (%) | 20' | 320 | 415 | 445 | 470 | 440 | 480 |
|  | 30' | 300 | 385 | 405 | 460 | 405 | 450 |
| Modulus(100/300% elongation; | 20' | 25/107 | 26/102 | 22/93 | 23/91 | 25/102 | 24/98 |
| (kg/cm²) | 30' | 27/115 | 26/106 | 24/102 | 24/98 | 26/110 | 25/106 |
| Elasticity | 30' | 48 | 48 | 49 | 50 | 52 | 51 |

(1) The appearance of the extruded tread (P-shaped profile, produced as described below [2]) was assessed visually in accordance with the following scale:
1 = faultless surface; no tears at thin lips
2 = slight unevenness; no tears
3 = slight unevenness; small individual tears
4 = uneven surface; several larger tears
5 = uneven surface; unsightly appearance, severely frayed.
(2) Velocity of extrusion and shrinkage were measured on an extruded tyre tread (screw extruder: Diameter of screw 30 mm, length of screw 120 mm, speed of rotation 40 revs/min, temperature 40 to 65°C). The other measurements were carried out in accordance with DIN 53 404.
(3) Change of Mooney-viscosity ML-4', 100°C upon storage of the sample at 70°C for three days

We claim:

1. A chloroprene polymer composition consisting of (a) 90 to 20 parts by weight of a benzene soluble chloroprene polymer having a Mooney viscosity ML-4' at 100°C. of from 30 to 100 and (b) 10 to 80 parts by weight of a benzene insoluble chloroprene polymer having a Mooney viscosity ML-4' at 100°C. of from 30 to 75 and consisting of a copolymer of 90 to 99% by 4. A composition as claimed in claim 1 in which component (b) has a Mooney viscosity ML-4' at 100°C of from 40 to 55.

5. A composition as claimed in claim 1 in which the comonomer of component (b) is ethanediol dimethacrylate.

6. A composition as claimed in claim 1 which has been vulcanised.

7. An article formed from a composition as claimed in claim 1.